Figure 1:
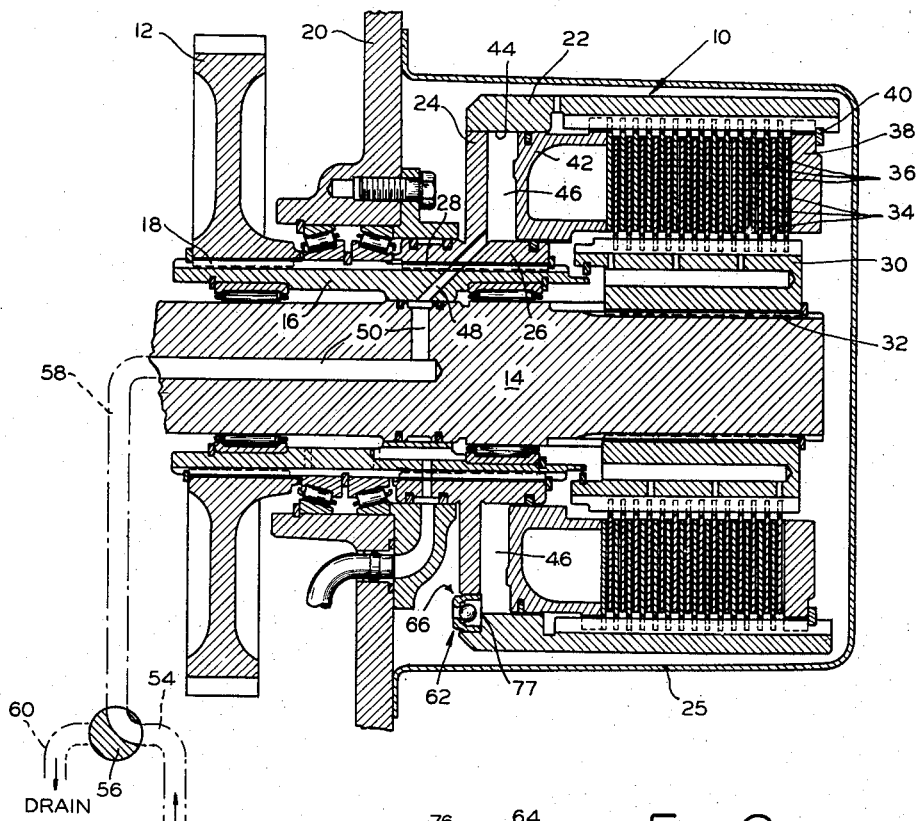

Sept. 27, 1960   R. H. BOLSTER   2,954,040
ONE-WAY VALVE
Filed Nov. 20, 1957

INVENTOR.
RONALD H. BOLSTER
BY Kenneth C. Witt
ATTY.

United States Patent Office 2,954,040
Patented Sept. 27, 1960

---

2,954,040

ONE-WAY VALVE

Ronald H. Bolster, Jackson, Mich., assignor to Clark Equipment Company, a corporation of Michigan Filed Nov. 20, 1957, Ser. No. 697,716

1 Claim. (Cl. 137—56)

This invention relates to one way valves and more particularly to such valves which employ a ball as the operating element.

An object of the present invention is to provide a valve of this type having improved closing and opening characteristics.

A more specific object is the provision of such a valve which may be used as a centrifugally operated valve to drain fluid from a rotatable fluid clutch or the like.

Taking a rotatable fluid actuated clutch as an example, it is well known to employ in automotive vehicle transmissions and elsewhere clutches comprising one or a multiplicity of friction discs and a fluid actuated piston to apply pressure on the discs to achieve clutching action. It is generally known also by those familiar with such clutches that to fully deactivate such a clutch it is necessary not only to cut off the source of fluid pressure used to actuate the clutch but it is necessary in many cases also to drain the fluid from the operating chamber in which the piston operates. If the operating chamber is not drained in this manner, centrifugal force on the fluid resulting from the rotation of the clutch may build up sufficient fluid pressure to cause a false or unwanted operation of the clutch with possible serious results. At the same time, however, in a clutch of this type, it is also very important that the means used to discharge fluid from the clutch when it is disengaged be such that it will close immediately when it is desired to actuate the clutch again. Any delay in such closing of the fluid discharge means causes an equal delay in the filling of the operating chamber and the actuation of the clutch, and it will be appreciated that even a small delay may be intolerable in many instances, such as in an automatic transmission, for example. Such mechanisms frequently depend on almost instantaneous clutch actuation for proper operation.

The problems of draining such clutches and refilling them again very quickly have been particularly difficult in connection with transmissions for heavy duty vehicles in which large torques and large volumes of oil or other fluid are involved, and especially where considerable variation in speed is encountered such as is frequently the case with construction machinery and the like.

I have discovered that if a step structure is employed adjacent the seat of a ball type one way valve that better opening and fluid discharge characteristics and quicker closing result than if previously known constructions are employed. For a disclosure of one preferred embodiment of my invention, reference should be had to the subsequent description and to the accompanying drawing in which Figure 1 is a longitudinally sectional view through a fluid operated multiple disc clutch embodying my invention, while Figure 2 is an enlarged sectional view of the ball element and step arrangement.

Figure 2:
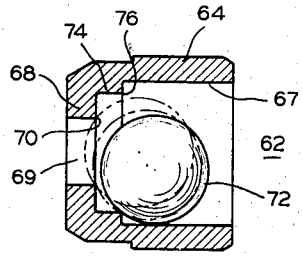

In Figure 1 of the drawing the numeral 10 indicates generally a clutch mechanism in which the present invention is embodied. The clutch mechanism illustrated is utilized to connect together, when conjoint rotation is desired, a gear 12 and a shaft 14. It will be observed that the gear 12 is coaxial with the shaft 14, the gear 12 being mounted on a sleeve or quill member 16 which surrounds the shaft 14. The gear is connected to sleeve 16 in a suitable manner such as by splines at 18. As illustrated, both the shaft 14 and sleeve 16 extend through a flat structural member 20 which may be a portion of the housing of a transmission, the gear 12 being located within the housing.

The clutch 10, which is located exteriorly of the housing, includes a cylindrical drum 22 which is connected to sleeve 16 in a suitable manner for rotation therewith. As shown the drum member 22 includes an end wall 24 having an integral hub portion 26 which is splined at 28 to sleeve 16. A cover member 25 for the clutch is secured to the outer surface of housing member 20.

A collar member 30 is connected to shaft 14 by splines 32 or in any other equivalent manner. A plurality of annular friction discs 34 and 36 are located between hub member 30 and drum member 22. Alternate discs 34 are connected by means of teeth or splines to collar member 30 while the intervening discs 36 are connected by teeth or splines to drum 22. Discs 34 and 36 are thus secured to their respective supporting members 30 and 22 for rotation therewith but these discs are movable axially into and out of friction engagement to provide engagement and disengagement of the clutch.

The clutch structure includes a backing plate or ring 38 which is secured at the outer end of the drum 22 by a snap ring 40 or the like. For compressing the discs to engage the clutch an annular piston 42 is provided. This piston operates in the inner bore 44 of drum 22 and is moved to the right to compress discs 34 and 36 in response to the application of fluid pressure in chamber 46. Fluid is admitted to chamber 46 through a passage 48 in sleeve 16 which receives a fluid through a passage 50 in shaft 14. I have shown schematically a fluid pressure source 53 which supplies fluid under pressure through a line or conduit 54 to a valve 56. When the latter is opened fluid under pressure is admitted through a conduit 58, through passages 50 and 48 to the fluid chamber 46; valve 56 is illustrated in this position in the drawing. When valve 56 is turned to the drain position, interconnecting passage 58 and a drain passage 60, the pressure in chamber 46 is relieved and the fluid is allowed to drain back through conduits 48, 50 and 58 to drain line 60.

As illustrated in the drawing, the clutch, gear, shaft and other parts are provided with the necessary bearings, seals and the like to provide satisfactory operation.

For purposes of illustration let it be assumed that gear 12 rotates continuously during operation of the illustrated mechanism, and that it is desired to have shaft 14 rotate with gear 12 when clutch 10 is engaged but at the same time to provide a minimum of drag on shaft 14 and freedom from false engagement of the clutch when external fluid pressure is cut off from chamber 46.

When valve 56 is operated to cut off the source of fluid pressure and connect chamber 46 to drain a portion of the oil or other hydraulic fluid in chamber 46 will drain from this chamber. However, if clutch drum 22 and piston 42 are rotating it will be appreciated, as pointed out previously, that a portion of the fluid will remain in chamber 46, and the centrifugal force produced by this fluid may provide enough pressure on piston 42 to cause the clutch discs to partially engage and provide a "drag" on shaft 14 or perhaps under some circumstances to engage fully and cause undesired false operation.

To prevent such an occurrence, I provide a one way valve structure which is indicated generally by the numeral 62. This structure preferably is located near the outer periphery of chamber 46 as shown in Figure 1 so that fluid which is thrown outwardly by centrifugal force may be discharged through it.

The operation of valve 62 as illustrated depends on a combination of centrifugal force and fluid pressure. For convenience of installation, the valve 62 preferably comprises a cylindrical housing member 64 which is arranged to be inserted in a suitable opening 66 in the end wall 24 of the clutch drum 22, although it will be appreciated that this separate housing may be eliminated if desired and a suitable passageway made in end wall 24 itself.

As shown, a circular passageway 67 is provided in member 64. At the outer end, that is, the end away from chamber 46, member 64 is provided with an inwardly extending portion 68 which provides a restriction of passageway 67. Portion 68 forms a circular opening 69. The inside edge 70 of opening 69 provides a seat for a sphere or ball member 72, the diameter of ball member 72 being larger than the diameter of opening 69 but smaller than the diameter of passageway 67. Adjacent opening 69 and inside passageway 67 an annular step portion 74 is provided, the step structure 74 forming a sharp corner 76 as illustrated.

When fluid under pressure is admitted to chamber 46 it attempts to flow outwardly through valve 62 but such flow causes sphere 72 to move to the position indicated by the dash double dot line in Figure 2, in which the sphere is seated or in engagement with edge portion 70, thus closing the passageway 67 and preventing the escape of fluid as long as the ball remains in this position. When fluid pressure is removed from chamber 46 the centrifugal force produced on the ball 72 by the rotation of the clutch causes it to move to the position illustrated by the solid line in Figure 2 and allow fluid to escape through the passageway 67, around ball 72 and out through opening 69.

I have found that the step structure of this valve is very advantageous in securing prompt closing of the valve by movement of ball 72 to its seat 70. Such action apparently occurs in two steps, with the intermediate position being illustrated by the dash single dot line in Figure 2. Since the ball 72 need rise only a small amount to get up on the first step, movement of the ball is initiated quickly, and once the ball is moving it makes a second step and quickly moves into closed position on the seat. If it were not for the step structure it would be difficult, if not impossible, to achieve an equal lift of the ball. It would be necessary in such a case to provide a smaller passageway 67 to decrease the lift and this would result, in turn, in a smaller flow through the valve when it is open. It appears that the step structure also is beneficial in producing a turbulence of the fluid which helps in raising the ball to initiate closing.

The structure disclosed and claimed herein also is very advantageous in opening the valve when fluid pressure is released, to allow fluid to be discharged quickly from the chamber. Because of the sharp edge of seat 70 the ball quickly moves outwardly out of the path of fluid flow through opening 69, the movement of the ball being a pivoting movement about edge 70. Then, because of the step, the ball comes to rest remotely from the bottom edge of the seat 70 (in the solid line position), thus providing greater area around the ball for discharging fluid.

Ball 72 must be prevented from entering chamber 46. As illustrated in the drawing, this is accomplished by locating opening 66 in a position such that portion 77 of drum 22 partially blocks the inner opening to passageway 67, and thus retains ball 72 therein.

It will be appreciated that the actual dimensions of the passageway 67, aperture 69, sphere 72, and step 74 must be chosen to suit the viscosity of the fluid being used, the fluid pressure, and the volume of the fluid which must be handled. Also if the one way valve is employed in a rotatable clutch in the manner disclosed herein, the speed range over which the valve must operate is extremely important, as is the distance of the sphere from the axis of rotation, and these factors must be considered in designing the one way valve. The data set forth below provides the essential dimensions and other information on a typical one way valve, constructed according to this invention, which has performed satisfactorily in a clutch structure such as that illustrated in Figure 1 of the drawing.

| | |
|---|---|
| Speed range | 360 to 2100 r.p.m. |
| Distance of sphere from axis (radius of gyration) | 6.625 inches. |
| Fluid | Type A automatic transmission fluid. |
| Fluid pressure | 140 pounds/sq. inch. |
| Volume of fluid to be drained from clutch | Approx. 1½ pints. |
| Time for draining at maximum speed | Approx. 2 seconds. |
| Diameter of passageway 67 | .748–.750 inches. |
| Diameter of aperture 69 | .401–.406 inches. |
| Diameter of sphere 72 (steel) | .5625 inch. |
| Step 74: | |
| Diameter of cylindrical surface | .625–.630 inches. |
| Length of cylindrical surface | .135–.140 inches. |

It will be appreciated also that it is not essential that passageway 67 be circular, although this is the easiest and least costly configuration to produce ordinarily.

Thus, while I have described and illustrated herein a preferred embodiment of my invention it will be understood that modifications may be made. I intend to cover by the appended claim all such modifications which fall within the true spirit and scope of my invention.

I claim:

In a rotatable chamber adapted to rotate at varying speeds about a predetermined axis, means for selectively admitting pressurized liquid to the said chamber, rotation responsive means for draining liquid from the said chamber under certain conditions, the said last named means comprising a cylindrical passageway through a wall of the said operating chamber providing a conduit from the chamber to the outside for the passage of the liquid, the axis of the said cylindrical passageway being approximately parallel to the said predetermined axis and rotatable thereabout, a radially inwardly projecting portion at the outer end of the said cylindrical passageway remote from the said chamber, the said inwardly projecting portion forming a circular opening and the innermost edge of the said opening serving as a valve seat, a ball valve element larger in diameter than said seat located in said passageway so as to be urged toward engagement with said seat by liquid in the said operating chamber flowing out through the said passageway and to be urged out of engagement with the said seat by centrifugal force tending to move the ball radially outward, and an annular step portion located in the said passageway adjacent the said seat and coaxial therewith, the said step portion being of greater diameter than the said ball element but of smaller diameter than the said passageway and providing a sharp edge over which the said ball element pivots in moving between a first position in engagement with said seat and a second position within the larger portion of the said passageway whereby the movements of the ball valve element between such positions occur in two steps and when the ball valve element is located in the said larger portion of the passageway the step portion holds it remote from the said seat to provide a minimum obstruction of the passageway.

References Cited in the file of this patent

UNITED STATES PATENTS

| | | |
|---|---|---|
| 1,564,624 | Riley | Dec. 8, 1925 |
| 1,764,186 | Teesdale | June 17, 1930 |
| 2,511,518 | Stephens | June 13, 1950 |
| 2,740,512 | Fischer | Apr. 3, 1956 |
| 2,806,568 | Bliss | Sept. 17, 1957 |

FOREIGN PATENTS

| | | |
|---|---|---|
| 800,643 | France | May 4, 1936 |
| 72,026 | Denmark | Jan. 15, 1951 |